(12) United States Patent
Matakawa et al.

(10) Patent No.: US 6,503,313 B2
(45) Date of Patent: Jan. 7, 2003

(54) GRAFT COPOLYMER AND COMPOSITION THEREOF

(75) Inventors: Shuichi Matakawa; Toshihiko Abe, both of Miyoshi-machi (JP)

(73) Assignee: Fuji Kasei Kogyo Co., Ltd., Tokyo-To (JP)

( * ) Notice: Subject to any disclaimer, the term of this patent is extended or adjusted under 35 U.S.C. 154(b) by 0 days.

(21) Appl. No.: 09/725,173

(22) Filed: Nov. 29, 2000

(65) Prior Publication Data
US 2001/0002416 A1 May 31, 2001

(30) Foreign Application Priority Data
Nov. 29, 1999 (JP) ............................. 11-338562

(51) Int. Cl.[7] ................ G08G 77/44; C08F 30/08; C08L 51/00
(52) U.S. Cl. ................ 106/287.1; 106/287.15; 525/926; 525/100; 525/474; 525/479; 526/245; 526/279; 526/328; 526/328.5; 528/25; 528/26; 528/32; 528/41
(58) Field of Search ................ 525/926, 100, 525/474, 479; 526/245, 279, 328, 328.5; 528/25, 28, 32, 41; 106/287.1, 287.15

(56) References Cited

U.S. PATENT DOCUMENTS 5,206,298 A  *  4/1993  Kawaguchi ............ 525/283
5,962,074 A  *  10/1999  Wollner ................. 427/322
6,030,712 A  *  2/2000  Notsu et al. ........... 428/480

OTHER PUBLICATIONS

Derwent Abstract of JP 01056593 A, Mar. 1989, assigned to General KK and Ricoh KKKK.*

* cited by examiner

Primary Examiner—Robert Dawson
Assistant Examiner—Jeffrey B. Robertson
(74) Attorney, Agent, or Firm—Lowe Hauptman Gilman & Berner, LLP (57) ABSTRACT

A graft copolymer of: an organic solvent soluble fluoropolymer having at least one urethane linkage and containing at least one radically polymerizable bond; at least one polysiloxane having a radically polymerizable terminal group; at least one monomer having a radically polymerizable double bond and a fluoroalkyl group per monomer molecule; and at least one different radically polymerizable monomer. Compositions containing this graft copolymer composition are suitable for use as a coating having water repellent, oil repellent and stain resistant properties over a long period of time.

6 Claims, 4 Drawing Sheets

GRAFT COPOLYMER AND COMPOSITION THEREOF

BACKGROUND OF THE INVENTION

The present invention relates to a graft copolymer and a composition containing the graft copolymer. Coatings obtained by the use of the graft copolymer or the composition containing the graft copolymer of the present invention can maintain excellent water repellent, oil repellent and stain resistant properties over a long period of time.

PRIOR ART

In recent years, coatings on outer walls of tall buildings and vehicles, etc. are required to be maintenance-free in view of maintenance of esthetic values, cleaning work saving, and the like.

In such applications, curing type acrylic resins known as acrylurethane resins have been heretofore used. However, durability of their coatings is not so satisfactory, and there are problems such as surface chalking or yellowing. Thus, they are hardly maintenance free due to necessity of frequent peeling and repainting operations.

Organic solvent-soluble fluoro-polymers represented by those described in Japanese Unexamined Patent publications Nos. 1982-34107 and No.1986-57609 may be mentioned as one which can improve durability of coatings, and which are more widely used. Although organic solvent-soluble fluoro-polymers have solved the problems of surface chalking and yellowing and initial stain resistant property, their water repellent and oil repellent properties are not so high. A further problem is that exposure to the outdoors environment unexpectedly deteriorate their water and oil repellent properties with lapse of time, and stain resistant property becomes gradually poor on this account.

A resin which is called as acrylsilicone type resin has recently appeared on the market as one that can impart the desired stain resistant property to such coatings. This resin generally forms hydrophilic coatings, and stains adhered to the surface are washed away by rain water. Although the acrylsilicone type resin shows relatively good performance in terms of the stain resistant property, there is a problem that ice and snow, that adhere to the surface of buildings and vehicles in cold districts due to hydrophilic nature of the surface, are difficult to remove, or they make visibility of traffic signs and advertising boards extremely poor.

In Japanese Unexamined Patent Publication No. 1998-291981, a hydrophobic coating-forming resin that may solve the above-mentioned problem is described. This resin does not suffer from the above-mentioned drawback because the formed surface is hydrophobic, and it shows sufficient stain resistant performance. However, although this resin maintains sufficient performance so long as it is used in an environment where the resin is not exposed to light, such as indoors, it has a problem that its water repellent and oil repellent properties, and hence its stain resistant property, decrease with lapse of time just as the above-mentioned solvent-soluble fluoro-polymer, when it is in an outdoor (light exposed) environment.

OBJECT OF THE INVENTION

Under such circumstances, what is to be attained by the present invention is to provide a graft copolymer from which coatings can be obtained such that the water repellent and oil repellent properties thereof do not drop in outdoor (light exposing) environment for a long period of time and excellent stain resistant property can be maintained. Another object is to provide a coating composition that contains such a graft copolymer.

SUMMARY OF THE INVENTION

The above-mentioned object can be attained by a graft copolymer of the present invention comprising a copolymerized product of

(A) from 2 to 66 percent by weight of an organic solvent-soluble fluoro-polymer having, via urethane linkage, radically polymerizable unsaturated bond portion, (B) from 4 to 40 percent by weight of polysiloxane of which one terminal group is radically polymerizable, said polysiloxane being one represented by the general formula:

(1)

wherein $R^1$ is a hydrogen atom or a hydrocarbyl group of 1 to 10 carbon atoms; $R^2$, $R^3$, $R^4$, $R^5$ and $R^6$ may be the same or different and are, respectively, a hydrogen atom or a hydrocarbyl group of 1 to 10 carbon atoms, and n is 2 or greater, and/or one represented by the general formula:

(2)

wherein $R^7$ is hydrogen atom or a hydrocarbyl group of 1 to 10 carbon atoms, $R^8$, $R^9$, $R^{10}$, $R^{11}$, and $R^{12}$ may be the same or different and are hydrogen atom or a hydrocarbyl group of 1 to 10 carbon atoms, p is an integer of 0 to 10, and q is an integer of 2 or greater, (C) from 1 to 50 percent by weight of a radically polymerizable monomer having one radically polymerizable double bond and at least one fluoroalkyl group in a molecule, and (D) from 4 to 93 percent by weight of a radically polymerizable monomer other than components (A), (B) and (C) (this may be hereinafter sometimes referred to simply as non-reactive, radically polymerizable monomer), provided that the sum of the amounts of components (A), (B), (C), and (D), plus impurities, is 100 percent by weight.

The present invention also relates to a composition containing the above-mentioned graft copolymer.

Coatings obtained by applying a composition comprising the above-mentioned graft copolymer have the advantage that water and oil repellent properties do not drop in an outdoor (light exposing) environment for a long period of time, and hence have an excellent stain resistant property.

DETAILED DESCRIPTION OF THE INVENTION

The graft copolymer and the composition containing the graft copolymer of the present invention will be more fully explained hereinbelow.

Organic solvent-soluble fluoro-polymer (A) having, via a urethane linkage, a radically polymerizable unsaturated bond portion, i.e. radically polymerizable fluoro-polymer (A) used in the present invention, can be obtained, for example, by reacting a hydroxyl group containing organic solvent-soluble fluoro-polymer (A-1) and an isocyanate group containing radically polymerizable monomer (A-2).

The hydroxyl group containing organic solvent soluble fluoro-polymer (A-1) is not limited so long as it contains at least a hydroxy group containing monomer part and a polyfluoroparaffin part as its constituents. For example, it may at least contain as its repeating units one represented by the general formula (3):

(3)

wherein $R^{21}$ and $R^{22}$, are the same or different, and represent, independently in each repeating unit, a hydrogen atom, a halogen (e.g. fluorine or chlorine) atom, an alkyl group of 1 to 10 carbon atoms (e.g. methyl, ethyl, propyl, butyl, or hexyl group), an aryl group of 6 to 10 carbon atoms (e.g. phenyl group), an alkyl group of 1 to 10 carbon atoms substituted with one or more halogen (e.g. fluorine or chlorine) atoms (e.g. trifluoromethyl, 2,2,2-trifluoroethyl, trichloromethyl group), or an aryl group of 6 to 10 carbon atoms substituted with one or more halogen (e.g. fluorine or chlorine) atoms (e.g. pentafluorophenyl group), and one represented by the formula (4):

(4)

wherein $R^{23}$, independently in each repeating unit, is hydrogen atom, halogen (e.g. fluorine or chlorine) atom, alkyl group of 1 to 10 carbon atoms (e.g. methyl, ethyl, propyl, butyl, or hexyl group), aryl group of 6 to 10 carbon atoms (e.g. phenyl group), alkyl group of 1 to 10 carbon atoms substituted with one or more halogen (e.g. fluorine or chlorine) atoms (e.g. trifluoromethyl, 2,2,2-trifluoro-ethyl, trichloromethyl group), or aryl group of 6 to 10 carbon atoms substituted with one or more halogen (e.g. fluorine or chlorine) atoms (e.g. pentafluorophenyl group), $R^{24}$ represents, independently in each repeating unit, a divalent group selected from $OR^{25a}$ group, $CH_2OR^{25b}$ group or $COOR^{25c}$ group, and $R^{25a}$, $R^{25b}$, and $R^{25c}$ positioned between O and OH are a divalent residual group selected from alkylene group of 1 to 10 carbon atoms (e.g. methylene, ethylene, trimethylene, tetramethylene, or hexamethylene group), a cycloalkylene group of 6 to 10 carbon atoms (e.g. cyclohexylene), an alkylidene group of 2 to 10 carbon atoms (e.g. isopropylidene group), or an arylene group of 6 to 10 carbon atoms (e.g. phenylene, tolylene, xylylene group).

The hydroxyl group containing organic solvent-soluble fluoro-polymer (A-1) may further contain as its constituent a repeating unit, for example, one represented by the general formula (5):

(4)

wherein $R^{26}$, independently in each repeating unit, is a hydrogen atom, a halogen (e.g. fluorine or chlorine) atom, an alkyl group of 1 to 10 carbon atoms (e.g. methyl, ethyl, propyl, butyl, or hexyl group), an aryl group of 6 to 10 carbon atoms (e.g. phenyl group), an alkyl group of 1 to 10 carbon atoms substituted with one or more halogen (e.g. fluorine or chlorine) atoms (e.g. trifluoromethyl, 2,2,2-trifluoroethyl, trichloromethyl group), or an aryl group of 6 to 10 carbon atoms substituted with one or more halogen (e.g. fluorine or chlorine) atoms (e.g. pentafluorophenyl), and $R^{27}$, independently in each repeating unit, is an $OR^{28a}$ group or an $OCOR^{28b}$ group, and $R^{28a}$ and $R^{28b}$ are respectively, a hydrogen atom, a halogen (e.g. fluorine or chlorine) atom, an alkyl group of 1 to 20 carbon atoms (e.g. methyl, ethyl, propyl, butyl, or hexyl group), an aryl group of 6 to 10 carbon atoms (e.g. phenyl group), an alkyl group of 1 to 10 carbon atoms substituted with one or more halogen (e.g. fluorine or chlorine) atoms (e.g. trifluoromethyl, 2,2,2-trifluoroethyl, or trichloromethyl group), or an aryl group of 6 to 10 carbon atoms substituted with one or more halogen (e.g. fluorine or chlorine) atoms (e.g. pentafluorophenyl group).

Inclusion of the repeating unit represented by the general formula (5) can improve solubility in an organic solvent.

The hydroxyl value of the hydroxyl group containing organic solvent-soluble fluoro-polymer (A-1) is preferably 5 to 250, more preferably 10 to 200, and most preferably 20 to 150. When the hydroxyl value is smaller than 5, a smaller amount of isocyanate group containing radically polymerizable monomer (A-2) is introduced, sometimes causing turbid reaction mixture or separation of two layers with lapse of time. On the other hand, when the hydroxyl value exceeds 250, compatibility with below-mentioned polysiloxane (B) radically polymerizable at one terminal is deteriorated, and sometimes graft copolymerization does not proceed. The hydroxyl group containing organic solvent-soluble fluoro-polymer (A-1) may have acid value. Inclusion of free carboxyl group is preferred since, when it has free carboxyl group, hardness, water repellent property and oil repellent property of the coating and, as a result, stain resistant property are improved due to improvement of adhesion of the coating to the substrate and improvement of reaction rate when it is combined with a curing agent such as melamine, isocyanate prepolymer, blocked isocyanate prepolymer mentioned later.

The hydroxyl group containing organic solvent-soluble fluoro-polymer (A-1) used in the present invention may be prepared by a known method, or it is commercially available. As commercial products, Lumiflon LF-100, LF-200, LF-302, LF-400, LF-554, LF-600, LF-986N (Products of Asahi Glass Company), Cefralcoat PX-40, A606X, A202B, CF-803 (Central Glass Co. Ltd.), Zaflon FC-110, FC-220, FC-250, FC-275, FC-310, FC-575, XFC-973 (Toa Gosei Co. Ltd), Zeffle GK-510 (Daikin Industries, Ltd.) or Fluonate Series (Dainippon Ink and Chemicals, Incorporated) may be mentioned. The hydroxyl group containing organic solvent-soluble fluoro-polymer (A-1) may be used alone, or mixtures of two or more of them may be used.

The isocyanate group containing radically polymerizable monomer (A-2) is not limited so long as it contains isocyanate group and radically polymerizable part. It is preferred to use, for example, a radically polymerizable monomer represented by the general formula (6)

(6)

wherein $R^{31}$ is a hydrogen atom or a hydrocarbyl group of 1 to 10 carbon atoms, for example alkyl of 1 to 10 carbon atoms (e.g. methyl, ethyl, propyl, butyl, pentyl or hexyl group), an aryl group of 6 to 10 carbon atoms (e.g. phenyl group), or a cycloalkyl group of 3 to 10 carbon atoms (e.g. cyclohexyl group), and $R^{22}$ is oxygen atom or straight or branched divalent hydrocarbyl group of 1 to 10 carbon atoms, for example, an alkylene group of 1 to 10 carbon atoms (e.g. methylene, ethylene, trimethylene, tetramethylene, or hexamethylene group), an alkylidene group of 2 to 10 carbon atoms (e.g. propylidene group), an arylene group of 6 to 10 carbon atoms (e.g. phenylene, tolylene, or xylylene group), or a cycloalkylene of 3 to 10 carbon atoms (e.g. cyclohexylene group), or a radically polymerizable monomer represented by the general formula (7).

(7)

wherein $R^{41}$ is a hydrogen atom or a hydrocarbyl group of 1 to 10 carbon atoms, for example alkyl of 1 to 10 carbon atoms (e.g. methyl, ethyl, propyl, butyl, pentyl or hexyl group), aryl of 6 to 10 carbon atoms (e.g. phenyl group), or cycloalkyl of 3 to 10 carbon atoms (e.g. cyclohexyl group), and $R^{42}$ is oxygen atom or a straight or branched divalent hydrocarbon group of 1 to 10 carbon atoms, for example, an alkylene group of 1 to 10 carbon atoms (e.g. methylene, ethylene, trimethylene, tetramethylene, or hexamethylene group), an alkylidene group of 2 to 10 carbon atoms (e.g. propylidene group), an arylene group of 6 to 10 carbon atoms (e.g. phenylene, tolylene, or xylylene group), an alkylydene-1,4-phenylene group of 7 to 10 carbon atoms (e.g. isopropylidene-1,4-phenylene group), or a cycloalkylene of 3 to 10 carbon atoms (e.g. cyclohexylene group), as a preferred isocyanate group containing radically polymerizable monomer (A-2).

It is preferred to use one or more members of the group consisting of methacryloyl isocyanate, 2-isocyanatoethyl methacrylate, or m- or p-isopropenyl-α, α-dimethylbenzyl isocyanate as the isocyanate group containing the radically polymerizable monomer (A-2).

In the reaction to prepare the radically polymerizable fluoro-polymer (A) from hydroxyl group containing organic solvent-soluble fluoro-polymer (A-1) and isocyanate group containing radically polymerizable monomer (A-2), the latter (A-2) is reacted preferably in an amount of 0.001 mole or more and less than 0.1 mole, more preferably 0.01 mole or more and less than 0.08 mole to one equivalent of hydroxyl group of the former (A-1). When the amount of isocyanate group containing radically polymerizable monomer (A-2) is less than 0.001 mole, the graft copolymerization reaction is difficult, and sometimes turbid reaction mixture is caused or a mixture separates into two layers with lapse of time. Also, the amount of (A-2) of 0.1 mole or more is liable to cause gelation during the graft copolymerization reaction and thus unfavorable. Also, the reaction of hydroxyl group containing organic solvent-soluble fluoro-polymer (A-1) and isocyanate group containing radically polymerizable monomer (A-2) may be carried out in the absence or presence of a catalyst at room temperature to 100° C.

The component (A) obtained as described above is used in the range of 2 to 66 percent by weight preferably 3 to 50 percent by weight to the entire amount of all the components. If it is used in an amount of less than 2 percent by weight, formed coating sometimes has decreased water repellent property and oil repellent property. If it is used in an amount of more than 66 percent by weight, gelation sometimes occurs during graft polymerization reaction.

In the present invention, a monomer represented by the general formula (1) may be used as the polysiloxane (B) radically polymerizable at one terminal. In the general formula (1), $R^1$ is hydrogen atom or hydrocarbyl group of 1 to 10 carbon atoms. In this specification, a hydrocarbyl group of 1 to 10 carbon atoms indicate, for example, alkyl group of 1 to 10 carbon atoms (e.g. methyl, ethyl, propyl, butyl, pentyl, or hexyl group), aryl group of 6 to 10 carbon atoms (e.g. phenyl group), or cycloalkyl group of 3 to 10 carbon atoms (e.g. cyclohexyl group). $R^1$ is preferably hydrogen atom or methyl group. $R^2$, $R^3$, $R^4$, $R^5$, and $R^6$ in general formula (1) may be the same or different. $R^2$, $R^3$, $R^4$, and $R^5$ are preferably independently methyl or phenyl group. $R^6$ is preferably methyl, butyl, or phenyl group. Also, n in the general formula (1) is an integer of 2 or greater, preferably 10 or greater, and more preferably 30 or greater.

A monomer represented by the aforementioned general formula (2) may also be used as the polysiloxane (B) radically polymerizable at one terminal in the present invention. In the general formula (2), $R^7$ is hydrogen atom or a hydrocarbyl group of 1 to 10 carbon atoms, and preferably it is hydrogen atom or methyl group. $R^8$, $R^9$, $R^{10}$, $R^{11}$ and $R^{12}$ of the general formula (2) may be the same or different. $R^8$, $R^9$, $R^{10}$ and $R^{11}$ are preferably methyl or phenyl group. $R^{12}$ is preferably methyl, butyl or phenyl group. The symbol p in the general formula (2) is an integer of 0 to 10, and is preferably 3. The symbol q in the general formula (2) is an integer of 2 or greater, and preferably 10 or greater, and more preferably 30 or greater.

The polysiloxane (B) radically polymerizable at one terminal may be prepared by a known method, or it is commercially available. Examples of commercial products are Silaplane FM-0711 (number average molecular weight 1,000; Chisso Corporation), Silaplane FM-0721 (number average molecular weight 5,000; Chisso Corporation), Silaplane FM-0725 (number average molecular weight 10,000; Chisso Corporation), X-22-174DX (number average molecular weight 4,600; Shin-Etsu Chemical Co. Ltd.), and the like.

In the present invention, the polysiloxane radically polymerizable at one terminal represented by the general formula (1) may be used alone, or two or more of it may be mixed and used. Or polysiloxane radically polymerizable at one terminal represented by the general formula (2) may be used alone or two or more of it may be mixed and used. Furthermore, one or more polysiloxane radically polymerizable at one terminal represented by the general formula (1) and one or more polysiloxane radically polymerizable at one terminal represented by the general formula (2) may be mixed and used.

The polysiloxane (B) radically polymerizable at one terminal may be used in an amount of 4 to 40 percent by weight, preferably 5 to 30 percent by weight to the total amount of the used components. When its used amount is less than 4 percent by weight, the desired water repellent and oil repellent properties are insufficient, and as a result, the stain resistant property is insufficient. When its used amount exceeds 40 percent by weight, the amount of unreacted monomer components after polymerization is increased, and unfavorable situations such as softening of coatings, bleeding of unreacted monomer component and the like can occur.

The radically polymerizable monomer having one radically polymerizable double bond and at least one fluoroalkyl group in a molecule (C) of the present invention is not specifically limited, and exemplified by perfluorobutylethylene, perfluorohexylethylene, perfluorooctylethylene, perfluoro-decylethylene, 1-methoxy-(perfluoro-2-methyl-1-propene), 2,2,2-trifluoroethyl (meth)acrylate, 2,2,3,3,3-pentafluoropropyl (meth)acrylate, 2-(perfluorobutyl)-ethyl (meth)acrylate, 3-perfluorobutyl-2-hydroxypropyl (meth)acrylate, 2-(perfluorohexyl)ethyl (meth)acrylate, 3-(per-fluorohexyl-2-hydroxypropyl (meth)acrylate, 2-(perfluorooctyl)ethyl (meth)acrylate, 3-perfluorooctyl-2-hydroxypropyl (meth) acrylate, 2-(perfluorodecyl)ethyl (meth)acrylate, 3-perfluorodecyl-2-hydroxypropyl (meth)acrylate, 2-(perfluoro-3-methylbutyl)ethyl (meth)acrylate, 3-(perfluoro-3-methylbutyl)-2-hydroxypropyl (-meth) acrylate, 2-perfluoro-3-methylhexyl)ethyl (meth)acrylate, 2-(perfluoro-3methyloctyl)ethyl (meth)acrylate, 2-(perfluoro-3-methyldecyl)ethyl (meth)acrylate, and the like.

The radically polymerizable monomer (C) having one radically polymerizable double bond and at least one fluoroalkyl group (C) can be prepared by a known method or it is commercially available. Examples of commercial products are Acryester 3FE, 4FE, 5FE, 8FE, 17FE (Mitsubishi Rayon Co. Ltd.), Viscoat 3F, 3FM, 4F, 8F 8FM (Osaka Organic Chemical Industry Ltd.), Lightester M-3F, M-4F, M-6F FM-108, Lightacrylate FA-108 (Kyoeisha Chemical Co. Ltd.), M-1110, M-1210, M-1420, M-1620, M-1633, M-1820, M-1833, M-2020, M-3420, M-3433 M-3620, M-3633, M-3820, M-3833, M-4020, M-5210, M-5410, M-5610, M-5810, M-7210, M-7310, R-1110, R-1210, R-1420, R-1433, R-1620, R-1633, R-1820, R-2020, R-3420, R-3433, R-3620, R-3633, R-3820, R-3833, R-4020, R-5210, R-5410, R-5810, R-7210, R-7310 (Daikin Industries, Ltd.), HFIP-M, HFIP-A, TFOL-M, TFOL-A, PFIP-A, HpIP-AE, HFIP-I (Central Glass Co. Ltd), and the like.

In the present invention, the radically polymerizable monomer having one radically polymerizable double bond and at least one fluoroalkyl group (C) may be used alone, or two or more of it may be mixed and used.

The component (C) may be used in an amount in the range of 1 to 50 percent by weight, preferably 2 to 40 percent by weight to the total amount of the used components. When it is used in an amount less than 1 percent by weight, sometimes the desired water repellent and oil repellent properties in outdoors cannot be sufficiently maintained, and when it is used in an amount greater than 50 percent by weight, the copolymer becomes too expensive and is not practical.

"Radically polymerizable monomer (D) other than components (A), (B), and (C)", namely, the aforementioned "non-reactive radically polymerizable monomer (D)" means that it may have (a) functional group(s) which does (or do) not react with the radically polymerizable fluoro-polymer (A) except for radical polymerization under the radical polymerization condition. Concrete examples of such functional groups are, for example, halogen atom (e.g. fluorine, chlorine, or bromine atom), alkyl group of 1 to 20 carbon atoms (e.g. methyl, ethyl, propyl, butyl, hexyl, lauryl, or stearyl group), aryl group of 6 to 10 carbon atoms (e.g. phenyl, tolyl, or xylyl group), or aralkyl group of which alkyl portion is 1 to 10 carbon atoms and aryl portion is 6 to 10 carbon atoms (e.g. benzyl), (the above-mentioned alkyl, aryl and aralkyl groups are sometimes hereinafter collectively called simply as "hydrocarbyl R"), a hydrocarbyl R having one or a plurality of hydroxyl groups (e.g. hydroxymethyl, hydroxyethyl, hydroxypropyl, 2,3-dihydroxypropyl, hydroxybutyl, hydroxyphenyl, or 4-hydroxymethylphenyl), a hydrocarbyl R having one or a plurality of nitrile groups (e.g. cyanoethyl group), a hydrocarbyl R having one or a plurality of ether groups (e.g. methoxymethyl, ethoxyethyl, or methoxymethoxymethyl group), a hydrocarbyl R having one or a plurality of ester groups (e.g. acetoxymethyl group), a hydrocarbyl R having one or a plurality of tertiary amino group (e.g. dimethylaminoethyl or diethylaminoethyl), a hydrocarbyl R having one or a plurality of epoxy group (e.g. glycidyl, or 3,4-epoxycyclohexylmethyl), a hydrocarbyl R having one or a plurality of amide group, a hydrocarbyl R having one or a plurality of carboxyl groups (e.g. carboxymethyl group), a hydrocarbyl R having one or a plurality of urethane group, a hydrocarbyl R having one or plurality of urea group, the hydrocarbyl R having one or a plurality of alkoxysilyl group (e.g. trimethoxysilylmethyl, or dimethoxymethylsilyhnethyl group).

On the other hand, as functional groups which can react with the above-mentioned radically polymerizable fluoropolymer other than radical polymerization reaction during the radical polymerization, there may be mentioned, for example, acid halides (e.g. carboxylic acid chloride, carboxylic acid bromide, phosphoric acid chloride, or sulfonic acid chloride), acid anhydride (e.g. maleic anhydride), isocyanate compounds and the like. The above-mentioned non-reactive radically polymerizable monomer (D) cannot have these functional groups, but it may have any functional groups, which do not react with the radically polymerizable fluoro-polymer (A) under the above-mentioned condition.

Specific examples are, for example, styrenic monomers such as styrene, p-methylstyrene, p-chlorostyrene, or vinyltoluene; (meth)acrylate monomers having a hydrocarbyl group such as methyl (meth)acrylate, ethyl (meth)acrylate, n-propyl(meth)acrylate, i-propyl (meth)acrylate, n-butyl (meth)acrylate, i-butyl (meth)acrylate, tert-butyl (meth) acrylate, n-hexyl (meth)acrylate, cyclohexyl (meth)acrylate, 2-ethylhexyl (meth)acrylate, lauryl (meth)acrylate, stearyl (meth)acrylate, iso-bornyl (meth)acrylate, adamantyl (meth) acrylate, phenyl (meth)acrylate, or benzyl (meth)acrylate; vinylester monomers such as vinyl acetate, vinyl benzoate, or vinyl ester of branched mono carboxylic acid (Veova: Shell Chemical Co.); acrylonitrile monomers such as acrylonitrile, or methacrylonitrile; vinylether monomers such as ethylvinylether, n-butylvinylether, i-butylvinylether or cyclohexylvinylether; acrylamide monomers such as (meth)acrylamide, dimethyl(meth)acrylamide, or diacetone-acrylamide; basic nitrogen containing vinyl compound monomers such as vinylpyridine, N,N-dimethylaminoethyl (meth)acrylate, N,N-diethylaminoethyl (meth)acrylate, N,N-dimethyl (meth)acrylamide, 4-(N,N-dimethylamino) styrene, or N-{2-(meth)acryloyloxyethyl}-piperidine, and the like; epoxy group containing vinyl compound monomers such as glycidyl (meth)acrylate, 3,4-epoxycyclohexyl (meth)acrylate, or 3,4-epoxy-vinylcyclohexane, and the like; acidic vinyl compound monomers such as (meth) acrylic acid, angelic acid, crotonic acid, maleic acid, 4-vinylbenzoic acid, p-vinylbenzenesulfonic acid, 2-(meth) acryloyloxyethanesulfonic acid, or mono {2-(meth) acryloyloxyethyl} acid phosphate and the like; hydroxyl group containing vinyl compound monomers such as p-hydroxymethylstyrene, 2-hydroxyethyl(meth)acrylate, 2-hydroxypropyl (meth)acrylate, 3-hydroxypropyl (meth) acrylate, 2-hydroxybutyl (meth)acrylate, 4-hydroxybutyl (meth)acrylate, di-2-hydroxyethyl fumalate, polyethylene glycol or poly-propylene glycol mono(meth)acrylate or ε-caprolactone adducts thereof, adducts of α, β-ethylenically unsaturated carboxylic acid such as (meth) acrylic acid, crotonic acid, maleic acid, fumaric acid, itaconic acid or citraconic acid with ε-caprolactone, hydroxy alkyl ester of the above-mentioned α, β-ethylenically unsaturated carboxylic acid, or adducts of the above-mentioned α, β-ethylenically unsaturated carboxylic acid and butylglycidylether, phenylglycidylether, or branched carboxylic acid glycidylester (Cardura E; Shell Chemical Co.); silane compound monomers such as vinyltrimethoxysilane γ-methacryloxyethyltrimethoxysilane, γ-methacryloxyethylmethyldi-methoxysilane; olefinic monomer such as ethylene and propylene; halogenated olefin monomer such as vinyl chloride, vinylidene chloride, vinyl bromide, vinyl fluoride, tetrafluoroethylene, or chlorotrifluoroethylene; and others such as maleimide, vinylsulfones and the like.

As the non-reactive radically polymerizable monomer (D), the above-mentioned monomer may be used alone, or a mixture of two or more of the monomer (D) may be used. In view of copolymerization and resistance to yellowing, (meth)acrylate monomers are preferably used.

The component (D) is used in the range of 4 to 93 percent by weight, preferably 20 to 80 percent by weight to the total amount of the used components. If the amount is less than 4 percent by weight, adjustment of glass transition temperature of the copolymer, i.e. hardness of coating becomes difficult. When the amount exceeds 93 percent by weight, water repellent and oil repellent properties are insufficient and hence resistance to staining is insufficient.

In the present invention, the ratio of the amount by weight of component (A) to the total amount by weight of components (B), (C) and (D) used (namely, A/(B+C+D); hereinafter referred to as fluoro-polymer/acryl ratio) is preferably 2/1 to 1/50. When fluoro-polymer/acryl ratio is less than 2/1, gloss of coating is sometimes degraded. When fluoro-polymer/acryl ratio exceeds 1/50, water repellent and oil repellent properties are sometimes decreased.

To prepare the copolymer of the present invention using components (A), (B), (C) and (D), any conventionally known polymerization method may be used. Among others, solution polymerization method or non-aqueous dispersion radical polymerization method are most simple and convenient and particularly recommended.

As a solvent used in the polymerization, aromatic hydrocarbon compounds such as toluene, xylene, or aromatic hydrocarbon mixture solvent (Solvesso 100: Esso Petroleum); aliphatic and alicyclic hydrocarbon compounds such as n-hexane, cyclohexane, octane, mineral spirits or kerosene; ester compounds such as ethyl acetate, n-butyl acetate, i-butyl acetate, or butylcellosolve acetate, propylene glycol monomethylether acetate, 3-methoxybutyl acetate; ketone compounds such as acetone, methyl ethyl ketone, or methyl isobutyl ketone; alcohol compounds such as methanol, ethanol, n-propanol, i-propanol, n-butanol, i-butanol, ethylene glycol, propylene glycol, ethyl cellosolve, butyl cellosolve may be mentioned, and these solvents may be used alone or two or more mixtures of them may be used.

The above-mentioned polymerization may be carried out by a conventional method using one of various conventional known radical polymerization initiators, such as azo compounds or peroxide compounds. Polymerization time is not limited and usually selected in the range of 1 to 48 hours. Polymerization temperature is usually 30 to 120° C., preferably 60 to 100° C. The above-mentioned polymerization may be carried out by using a conventionally known chain transfer agent as desired, for example, by adding butyl mercaptane, dodecyl mercaptane, or α-methylstyrene dimer or a conventional known redox catalyst.

The molecular weight of the graft copolymer of the present invention is not specifically limited, and the weight average molecular weight of the graft copolymer by means of GPC (gel permeation chromatography) calculated from polystyrene standards is preferably in the range of about 5,000 to 2,000,000, and more preferably 10,000 to 1,000,000. If the molecular weight is smaller than 5,000, then film forming property, resistance to weathering, or resistance to chemicals is decreased, and if it exceeds 2,000,000, there is a danger of gelation during polymerization.

The graft copolymer of the present invention obtained as described above may be used as a composition with paint binder components. The composition of the present invention comprises the above-mentioned graft copolymer. Although a solution of the graft copolymer of the present invention may be used as it is, it is preferred to form a curable composition by combining the graft copolymer and a curing agent.

When a curable composition is formed, it may be formed usually by combining the graft copolymer with what is known as a curing agent for a curing type acryl paint. As such curing agent, for example, aniline-aldehyde resin, urea resin, melamine resin, isocyanate prepolymer, or blocked isocyanate prepolymer may be mentioned.

The hydroxyl value of the graft copolymer of the present invention is one of the factors, which affect properties of cured coatings. The hydroxyl value may be adjusted with the hydroxyl value of the aforementioned radically polymerizable fluoro-polymer (A) component. Furthermore, if hydroxyl group containing monomer is contained in the aforementioned non-reactive radically polymerizable monomer (D) component, then the hydroxyl value may be adjusted by the used amount of the monomer. Although the hydroxyl value of the graft copolymer is not specifically limited, a value of 100 to 200 is preferred in view of the hardness of the coating, resistance to chemicals, and resistance to staining.

It is also possible to cure the graft copolymer by moisture in atmosphere without any particular curing agent if an alkoxysilyl group containing monomer is contained in the aforementioned non-reactive radically polymerizable monomer (D) component.

The resin solid content of the composition of the present invention is not specifically limited and adequately selected depending on its use and the way it is used. Usually, however, the resin solid content is preferably 10 to 60 percent by weight.

The condition of drying of the composition of the present invention is not specifically limited, and usually drying is carried out at room temperature to 200° C. for one minute to 14 days.

If necessary, on the condition that addition is not departing from the purpose of the present invention, other resins such as fluoro-polymers, acrylic resins, polyester resins, polyether resins, polyurethane resins, epoxy resins, and the like, or various additives such as surfactants, extenders, colored pigments, anti-rusting pigments, fluoro-polymer powders, silicone resin powders, anti-rusting agent, dyes, wax, and the like may be added to the composition of the present invention.

EXAMPLES

The present invention is illustrated by the following examples. However, these examples do not restrict the scope of the present invention. In the following preparation examples, parts and percent or % are parts by weight and percent by weight unless otherwise indicated.

The names of commercial products of the materials used in the reference examples, preparation examples, (working) examples, and comparative examples are shown below.

(1) Hydroxyl group containing organic solvent-soluble fluoro-polymer (A-1) Cefralcoat CF-803 (hydroxyl value 60, number average molecular weight 15,000; Central Glass Co. Ltd.) Lumiflon LF-600 (hydroxyl value 60, number average molecular weight 15,000; Asahi Glass Company)

(2) Polymerizable polysiloxane radically polymerizable at one terminal (B) Silaplane FM-0721(number average molecular weight 5000; Chisso Corporation)

(3) Radically polymerizable monomer having one radically polymerizable double bond and at least one fluoroalkyl group in a molecule (C) Lightester FM-108 (heptadecafluorodecyl methacrylate; Kyoeisha Chemical Co. Ltd.)

(4) Radical polymerization initiator Perbutyl O (t-butylperoxy-2-ethylhexanoate; Nippon Oils & Fats Co., Ltd.)

(5) Curing type acrylic resin Desmophen A 160 (hydroxyl value 90; Sumitomo Bayer Urethane Co., Ltd.)

(6) Curing agent Coronate HX (isocyanulate prepolymer of hexamethylene diisocyanate; Nippon Polyurethane Co., Ltd.)

Physical property evaluation test methods used in the following working examples and comparative examples are shown below.

(1) Initial Resistance to Staining

A line is drawn by a felt pen (red color) on cured coatings and repelling degrees are observed. Evaluation is made with three ratings and the results are shown in Table 2. Coatings that repel the ink just like oil drops, allowing the ink to be wiped away easily by cloth are indicated with mark ⊙, those that repel the ink just like oil drops, partly allowing the ink to be wiped away by cloth and partly leaving the ink on the coating after wiping are indicated with symbol ○, those that do not repel the ink and do not allow the ink to be wiped away by cloth are shown with symbol X.

(2) Removability of Stains (Resistance to Staining)

Lines are drawn by felt pens (4 colors of blue, black, red and green) on cured coatings, and after drying for 24 hours at room temperature, blue colored ink and black colored inks are wiped with an ethanol impregnated cloth, and red and green inks are wiped with a xylene impregnated cloth.

Evaluation was made for the observation at three ratings described below, and the results are shown in Table 2. The cases where nothing remains at all after the wiped ink are indicated with a mark ○, the cases where slight marks remain are indicated with ⊙, and the cases where clear marks remain are indicated with X.

(3) Initial Water Repellent and Initial Oil Repellent Properties (Contact Angle Determination).

Using CA-W type automatic contact angle meter produced by Kyowa Interface Science Co. Ltd, contact angles when about 5 µl of deionized water or n-hexadecane is placed on cured coatings are measured. Six measurements were made at different points where the liquids are placed, and the average value of four points excluding the highest values and the lowest values is calculated and rounded to an integer by counting fractions of 0.5 and over as a whole number and disregarding the rest. The results are shown in Table 2 and FIGS. 1 to 4.

Figure 1:
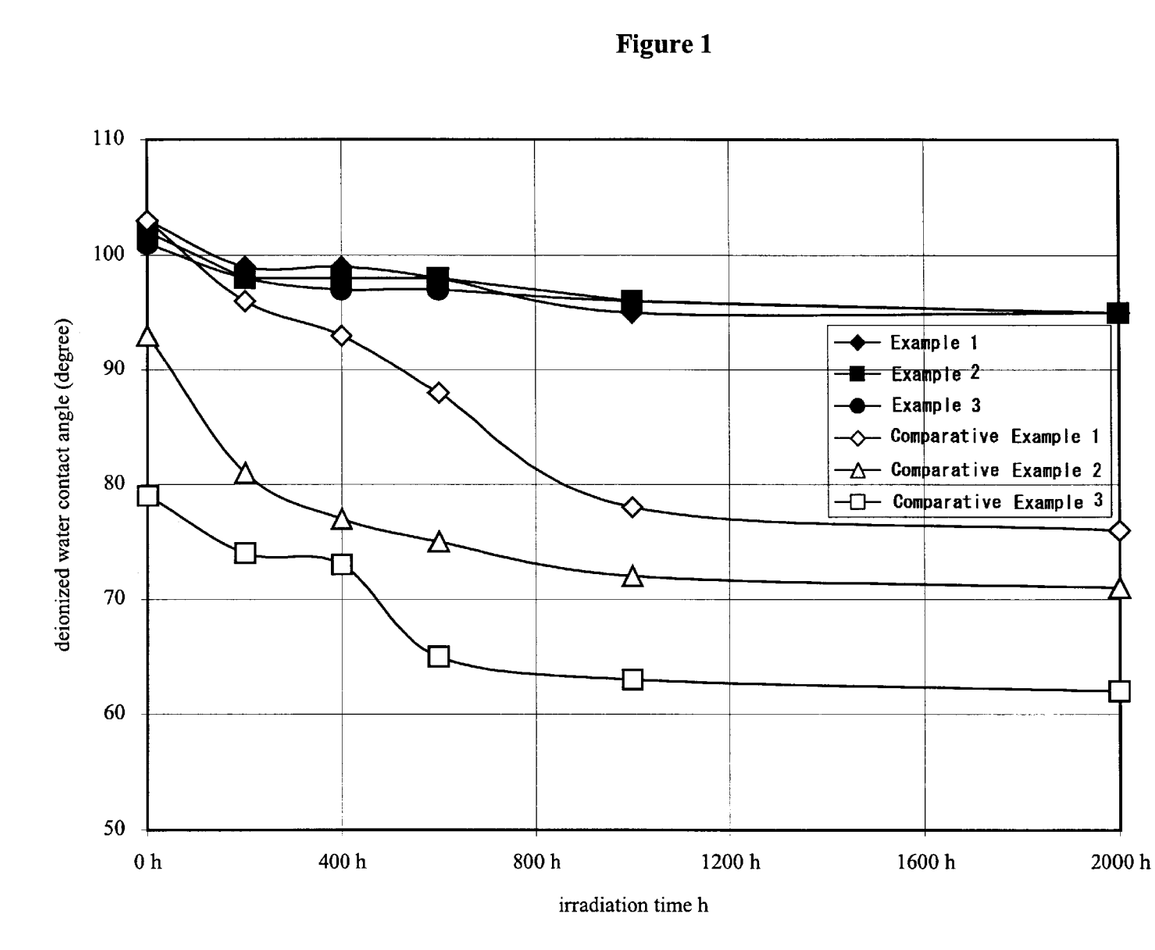
FIG. 1 is a graph showing the results on the contact angle v. the irradiation time of deionized water in Examples 1–3 and in Comparative examples 1–3.
Figure 2:
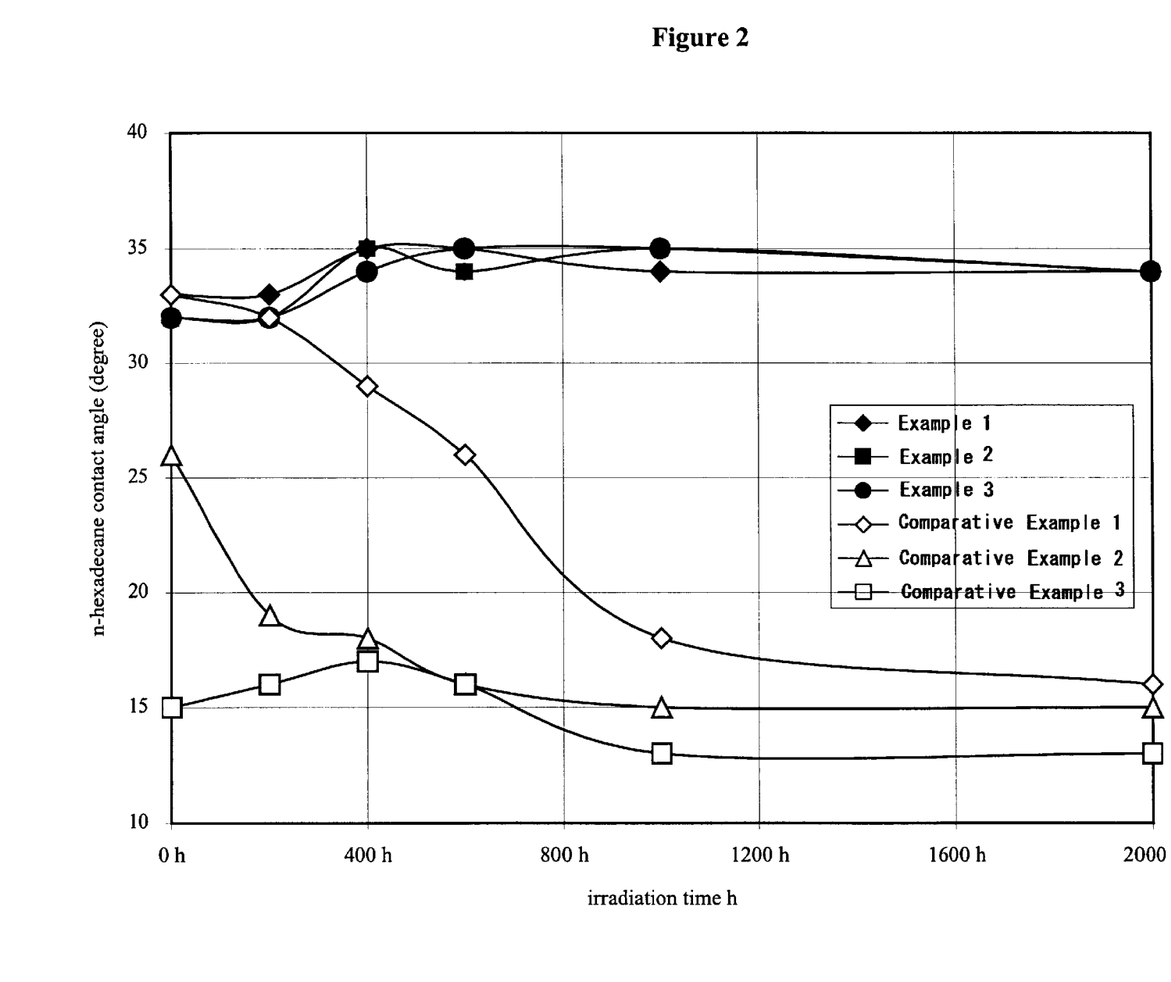
FIG. 2 is a graph showing the results on the contact angle v. irradiation time of n-hexadecane in Examples 1–3 and Comparative Examples 1–3.
Figure 3:
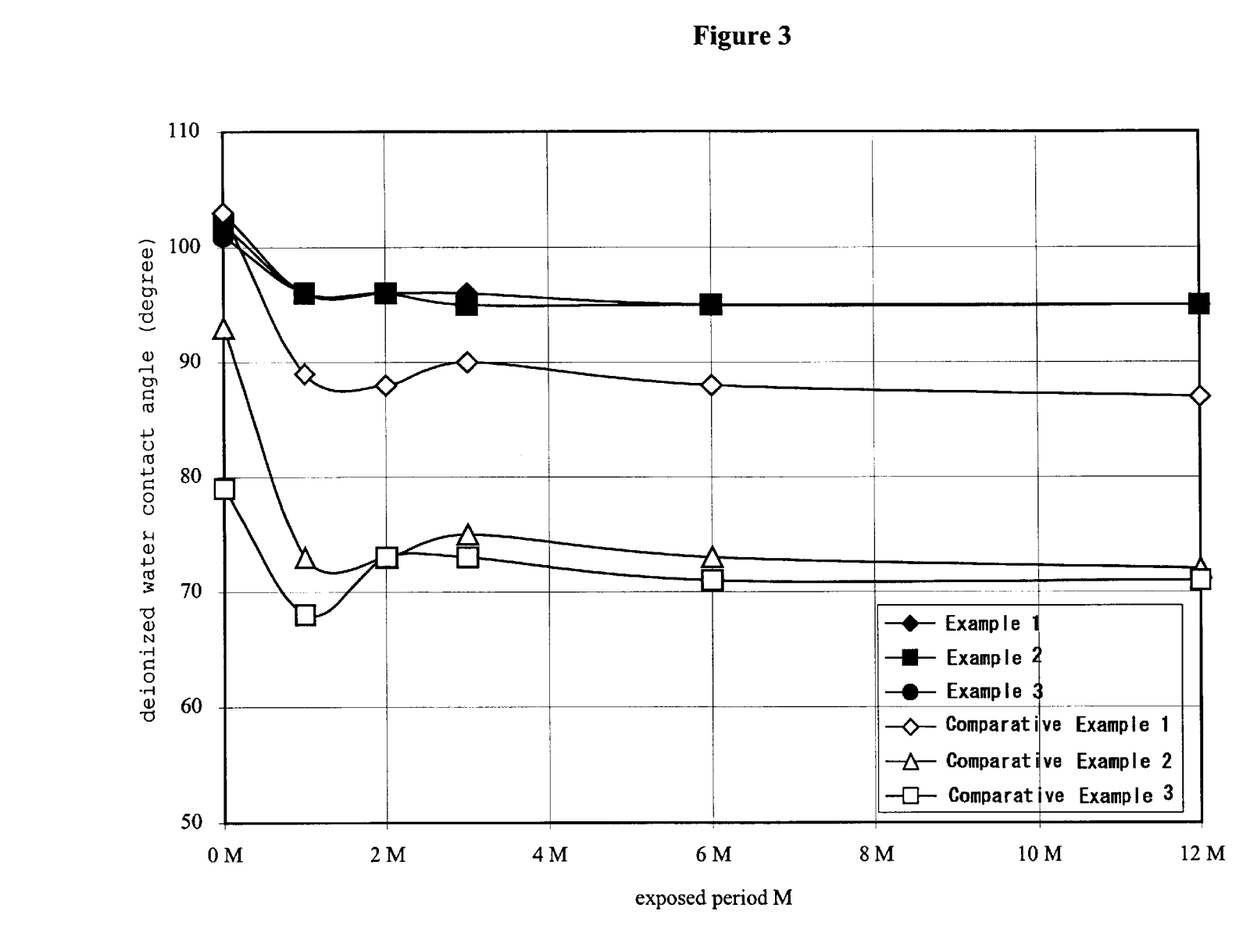
FIG. 3 is a graph showing the results on the contact angle v. exposure time of deionized water in Examples 1–3 and Comparative Examples 1–3.

(4) Durability of Water Repellency and Oil Repellency (4-1)Accelerated Weathering Test Using Ci4000 Sunshine Weather-O-meter produced by ATLAS Co. Ltd, samples were exposed according to ISO 11341; method 1 outdoors (paint, varnish accelerated weathering test method) using xenon as a light source. A coated board was taken out from the exposure site when 200, 400, 600, 1000 and 2000 hours have lapsed, and briefly washed with a detergent (Lipon LS-250; Lion Co.) and tap water, and after moisture is thoroughly removed, contact angles were measured as explained above. The results for deionized water are shown in FIG. 1 and those of n-hexadecane are shown in FIG. 2.

(4-2) Exposure Test

Samples were exposed on the roof top of our research center located Miyoshi-cho, Iruma-gun, Saitama prefecture, for one year by facing them to the south at an angle of 45° from the horizontal plane.

Figure 4:
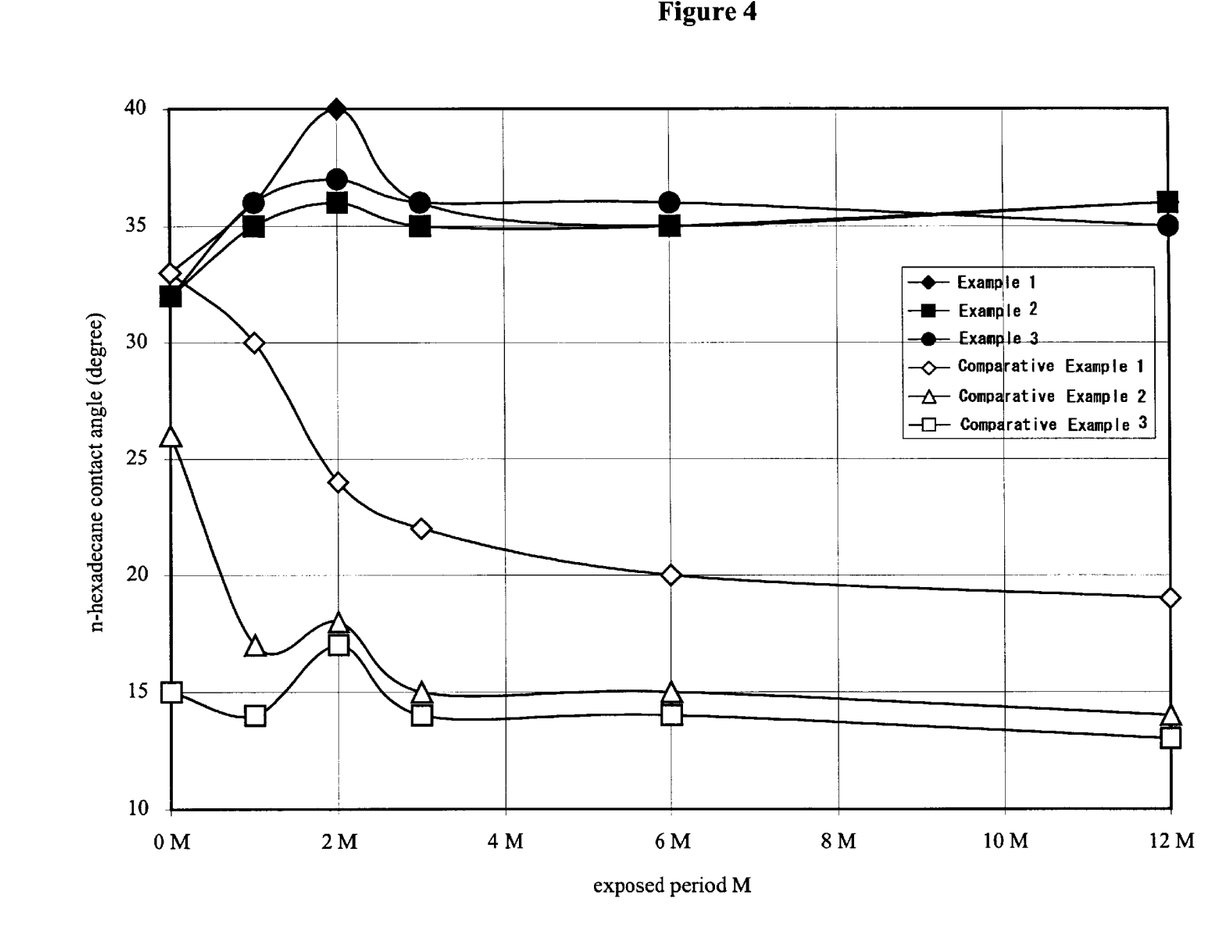
FIG. 4 is a graph showing the results on the contact angle v. exposure time of n-hexadecane in Examples 1–3 and Comparative Examples 1–3

A coated board was taken when 1, 2, 3, 6 and 12 months have lapsed, and was washed with a detergent (Lipon LS-250; Lion Corporation) and tap water, and after removing moisture thoroughly, the above-mentioned contact angle measurement and stain removal test were carried out. The results for deionized water are shown is FIG. 3 and those for n-hexadecane are shown in FIG. 4.

Referential Example 1

In this example, synthesis procedure of radically polymerizable fluoro-polymer (A) of the present invention is shown.

To a glass reactor equipped with a mechanical stirrer, a thermometer, a condenser, and a dry nitrogen gas inlet, were added 1554 parts of Cefralcoat CF-803, 233 parts of xylene, 6.3 parts of 2-isocyanatoethylmethacrylate, and they are heated at 80° C. under dry nitrogen atmosphere. After reacting them for two hours at 80° C. and confirming disappearance of isocyanate absorbence by a infrared spectrum of the sampled material, the reaction mixture was taken out and radically polymerizable fluoro-polymer (A) having 50% non-volatile matter was obtained.

Preparation Example 1.

In this example, a synthesis procedure of the graft copolymer of the present invention is shown. To a glass reactor equipped with a mechanical stirrer, a thermometer, a condenser, and a nitrogen gas inlet, were added 36.2 parts of radically polymerizable fluoro-polymer (A) synthesized in Referential Example 1, 11.6 parts of methyl methacrylate, 4.9 parts of 2-hydroxyethyl methacrylate, 10.5 parts of FM-0721, 7.7 parts of FM-108, 0.4 parts of methacrylic acid, 1.5 parts of xylene, 60.2 parts of n-butyl acetate, and 0.3 part of Perbutyl O, and after heating to 90° C. in nitrogen atmosphere, they were maintained at 90° C. for 2 hours. Perbutyl O (0.1 part) was supplemented followed by maintaining at 90° C. for 5 hours, and a solution of the desired graft copolymer having 40% volatile material and weight average molecular weight of 168000 by means of GPC (gel permeation chromatography) was obtained.

Preparation Example 2,3 and Comparative Preparation Example 1.

In this example, synthesis procedures for the graft copolymer of the present invention and for the comparative graft copolymer are shown.

Except that the charged amounts of the solvent, monomers, and the initiators were changed as shown in Table 1, the same operations as in Preparation Example 1 were used to obtain a solution of the desired graft copolymer. A graft copolymer of the present invention was obtained in Preparation Examples 2 and 3. On the other hand, Comparative Preparation Example 1 shows the case where component (C) of Preparation Example 1 was not used.

Example 1

An equivalent amount of Colonate HX was added to the hydroxyl equivalent of the obtained graft copolymer of Preparation Example 1, and it was diluted with n-butyl acetate so that non-volatile matter in the coating is 35 percent by weight. The above-mentioned coating composition was applied on a white colored acryl resin coated board (50×100 mm) with a bar coater #50. The coating was cured by heating at 140° C. for 30 minutes to obtain cured coating. Each of the above-mentioned tests was carried out and the results are shown in Table 2 and FIGS. 1 to 4.

The initial contact angle of this cured coating was 103° C. to deionized water and 33° C. to n-hexadecane, which were favorable values. The contact angles did not decrease greatly after the accelerated weathering test and the exposure test. Furthermore, good stain removability results were shown after the exposure test.

Example 2, 3 and Comparative Examples 1 to 3

Cured coatings were prepared and subjected to the above-mentioned various physical property evaluation tests in the same manner as Example 1 above, using the graft copolymers obtained in Preparation Examples 2 and 3 and Comparative Preparation Example 1. The results are shown in Table 2 and FIGS. 1 to 4 as Examples 2, 3 and Comparative Example 1, respectively. Also, cured coatings were prepared and subjected to the various physical property evaluation tests in the same manner as Example 1 above, using Lumiflon LF-600 that is organic solvent-soluble fluoro-polymer (A-1) in Comparative Example 2 or Desmophen A-160 that is a curing type acrylic resin in Comparative Example 3, and the results are shown in Table 2 and FIGS. 1 to 4. In Examples 2 and 3, initial contact angle values were relatively large, and these angles were well maintained, and their removability of stains after the exposure test was also good. In Comparative Example 1, although the initial contact angle value was relatively large, the angle decreased with lapse of time, and removability of stains after the exposure test was not favorable. In Comparative Example 2, the initial contact angle was moderate, and furthermore the angle decreased with lapse of time, and removability of stains after the exposure test was unfavorable like Comparative Example 1. In Comparative Example 3, contact angle was small from the initial stage, the angle was further decreased with lapse of time, and the removability of stains was bad from the initial stage.

From the above data, it is clear that the graft copolymer and the composition of the present invention can result in coatings which can impart excellent water repellency and oil repellency and stain resistance to the surface of substrates even in an exposing environment.

Advantages of the Invention

Since the graft copolymer and the composition containing the same of the present invention are characterized by allowing one to obtain coatings which can impart excellent water repellency, oil repellency and stain resistance to substrate surfaces after formation of coatings, they may be applied to surface treatment of various substrates. More concretely, they may be applied to outer boards and outer walls of automobiles, train vehicles, other vehicles, or architecture (housing or buildings), inner walls of tunnels, and equipment for waterworks such as toilets, washbowls, bath tubs, kitchen sinks, and the like, heat exchangers such as air conditioners, refrigerators and the like, and road signs and convex mirrors on roads. They are effective to improve resistance to staining, visibility, and prevention of ice snow adherence.

What is claimed is:

1. A graft copolymer comprising a copolymerized product of (A) 2 to 66 percent by weight of an organic solvent-soluble fluoro-polymer having, via a urethane linkage, at least one radically polymerizable unsaturated bond moiety, (B) 4 to 40 percent by weight of a polysiloxane, of which one terminal group is radically polymerizable, wherein said polysiloxane is represented by at least one compound corresponding to the general formula (1) or (2):

wherein $R^1$ is selected from the group consisting of a hydrogen atom and a hydrocarbyl group of 1 to 10 carbon atoms, $R^2$, $R^3$, $R^4$, $R^5$ and $R^6$ are the same or different and are respectively selected from the group consisting of a hydrogen atom and a hydrocarbyl group of 1 to 10 carbon atoms, and n is an integer of 2 or greater, or wherein $R^7$ is selected from the group consisting of a hydrogen atom and a hydrocarbyl group of 1 to 10 carbon atoms, $R^8$, $R^9$, $R^{10}$, $R^{11}$, and $R^{12}$ are the same or different and are at least one, respectively, selected from the group consisting of a hydrogen atom and a hydrocarbyl group of 1 to 10 carbon atoms, p is an integer of 0 to 10, and q is an integer of 2 or greater, (C) 1 to 50 percent by weight of a radically polymerizable monomer having at least one radically polymerizable double bond and at least one fluoroalkyl group per molecule, and (D) 4 to 93 percent by weight of a radically polymerizable monomer, other than any of components (A), (B) and (C), provided that the sum of the amounts of components (A), (B), (C), and (D), when considered in combination with impurities, is 100 percent by weight.

2. A graft copolymer described in claim 1 wherein said organic solvent-soluble fluoro-polymer (A) having, via a urethane linkage, a radically polymerizable unsaturated bond is a reaction product of an organic solvent-soluble fluoro-polymer having at least one hydroxyl group (A-1) and a radically polymerizable monomer having at least one isocyanate group (A-2).

3. A graft copolymer described in claim 2 wherein said radically polymerizable monomer having at least one isocyanate group (A-2) is at least one monomer selected from the group consisting of methacryloyl isocyanate, 2-isocyanatoethyl methacrylate, and m- or p-isopropenyl-α,α-dimethylbenzyl isocyanate.

4. A coating composition comprising a graft copolymer described in claim 1.

5. A coating composition comprising a graft copolymer described in claim 2.

6. A coating composition comprising a graft copolymer described in claim 3.

* * * * *